United States Patent
Mohr

[11] Patent Number: 6,042,122
[45] Date of Patent: Mar. 28, 2000

[54] CONVERTIBLE SLED ARRANGEMENT FOR COOLERS

[76] Inventor: Charles F. Mohr, 2451 Secane Rd., Secane, Pa. 19018

[21] Appl. No.: 09/271,355

[22] Filed: Mar. 17, 1999

[51] Int. Cl.$^7$ .................................................. B62B 13/18
[52] U.S. Cl. ............................................ 280/9; 280/43.14
[58] Field of Search .................................. 280/7.12, 7.14, 280/8, 9, 10, 24, 43.14, 43.22, 43.24, 47.34, 47.35, 47.371

[56] References Cited

U.S. PATENT DOCUMENTS

| | | | |
|---|---|---|---|
| 1,410,701 | 3/1922 | Metzger | 280/7.12 |
| 1,435,609 | 11/1922 | Kelly | 280/7.12 |
| 3,403,919 | 10/1968 | Weibling | 280/7.13 |
| 4,291,891 | 9/1981 | Blanchette | 280/9 |
| 4,618,157 | 10/1986 | Resnick | 280/47.24 |
| 5,106,109 | 4/1992 | Tattersall et al. | 280/9 |
| 5,368,319 | 11/1994 | Hummer | 280/47.34 |
| 5,373,708 | 12/1994 | Dumoulin, Jr. | 62/457.7 |
| 5,407,218 | 4/1995 | Jackson | 280/30 |
| 5,465,985 | 11/1995 | Devan et al. | 280/30 |

*Primary Examiner*—Richard M. Camby
*Attorney, Agent, or Firm*—Henderson & Sturm LLP

[57] ABSTRACT

A convertible sled arrangement 10 for transporting a cooler 100 to and from a beach wherein the arrangement includes a framework unit 11 dimensioned to receive and support a cooler 100 relative to a pair of runner members 30 operatively associated with the framework unit 11; wherein, each of the runner members 30 is provided with a roller assembly 40 that is adapted to be extended and retracted relative to the runner members 30 to provide either a rolling or a sliding transport of the cooler 100 over different terrain.

16 Claims, 2 Drawing Sheets

CONVERTIBLE SLED ARRANGEMENT FOR COOLERS

BACKGROUND OF THE INVENTION

1. Field of the Invention

The present invention relates to the field of cooler transporting devices in general and in particular to a convertible roller/sled arrangement to transport coolers to and from the beach.

2. Description of Related Art

As can be seen by reference to the following U.S. Pat. Nos. 5,106,109; 5,373,708; 5,407,218; and 5,465,985, the prior art is replete with myriad and diverse wheeled cooler transporting apparatus.

While all of the aforementioned prior art constructions are more than adequate for the basic purpose and function for which they have been specifically designed, they are uniformly deficient with respect to their failure to provide a simple, efficient, and practical cooler transporting arrangement that can be converted from a wheeled to a sled style transport mode.

As anyone who has tried to maneuver a wheeled cooler over a sandy surface is all too well aware, there are only a very few wheeled cooler arrangements that are more than barely adequate for fulfilling this task particularly in very fine powdery sand or very rough granular sand.

As a consequence of the foregoing situation, there has existed a longstanding need for a new and improved convertible sled arrangement for coolers wherein the primary mode of transportation can be converted from rollers to a pair of ski-style runners; and, the provision of such a construction is the stated objective of the present invention.

BRIEF SUMMARY OF THE INVENTION

Briefly stated, the convertible sled arrangement for coolers that forms the basis of the present invention comprises in general a framework unit, a convertible sled unit, an actuator unit, and a towing unit.

As will be explained in greater detail further on in the specification, the framework unit is designed to accommodate a conventional cooler and rests upon the convertible sled unit. The convertible sled unit in turn includes a pair of runner members wherein each runner member is provided with a spring loaded roller assembly that can be extended and retracted relative to the runner members to selectively convert the runner members from a sliding engagement to a rolling engagement with the terrain.

Furthermore, the actuator unit is slidably suspended above the runner members and includes a pair of actuator rods connected to an actuator handle; wherein, each of the actuator rods are provided with a plurality of pivoted lever arms which are operatively associated with the roller assemblies to extend and retract the roller assemblies relative to the runner members depending upon the angular orientation of the lever arms.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
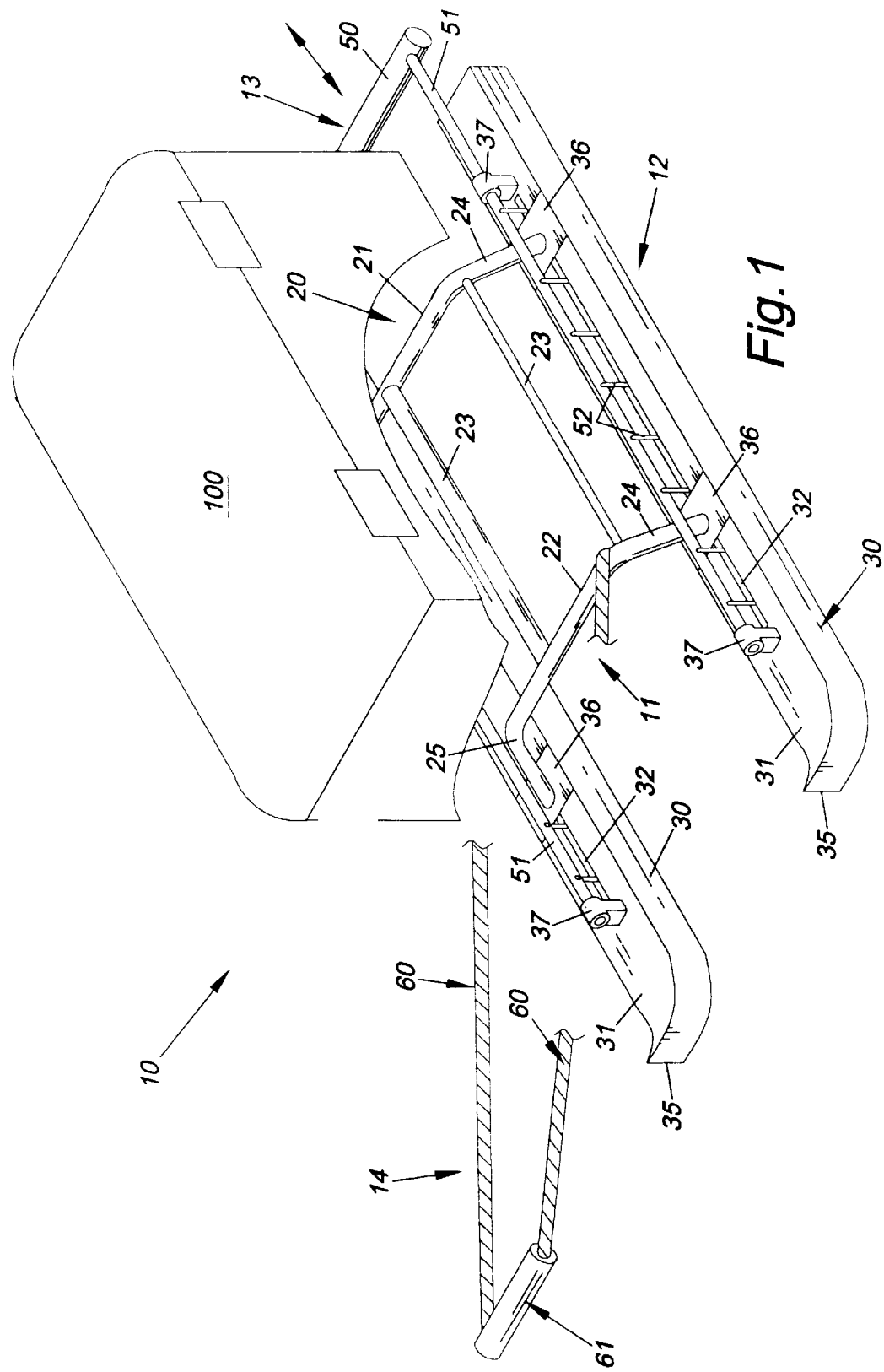
FIG. 1 is a perspective view of the convertible sled arrangement that forms the basis of the present invention.

As can be seen by reference to the drawings, and in particular to FIG. 1, the convertible sled arrangement for coolers that forms the basis of the present invention is designated generally by the reference number 10. The arrangement 10 comprises in general a framework unit 11, a convertible sled unit 12, an actuator unit 13, and a towing unit 14. These units will now be described in seriatim fashion.

As shown in FIG. 1, the framework unit 11 comprises a tubular framework member 20 including a plurality of lateral tubular support legs 21, 22 joined together by a plurality of longitudinal support rods 23 disposed in the same horizontal plane and connected to the upper surface of each support leg 21, 22 to provide a support grid framework that is dimensioned to support the bottom of a conventional cooler designated generally as 100.

As can also be seen by reference to FIG. 1, each of the support legs 21, 22 are provided with a pair of downwardly depending foot elements 24, 25 which are operatively associated with the convertible sled unit 12.

Figure 2:
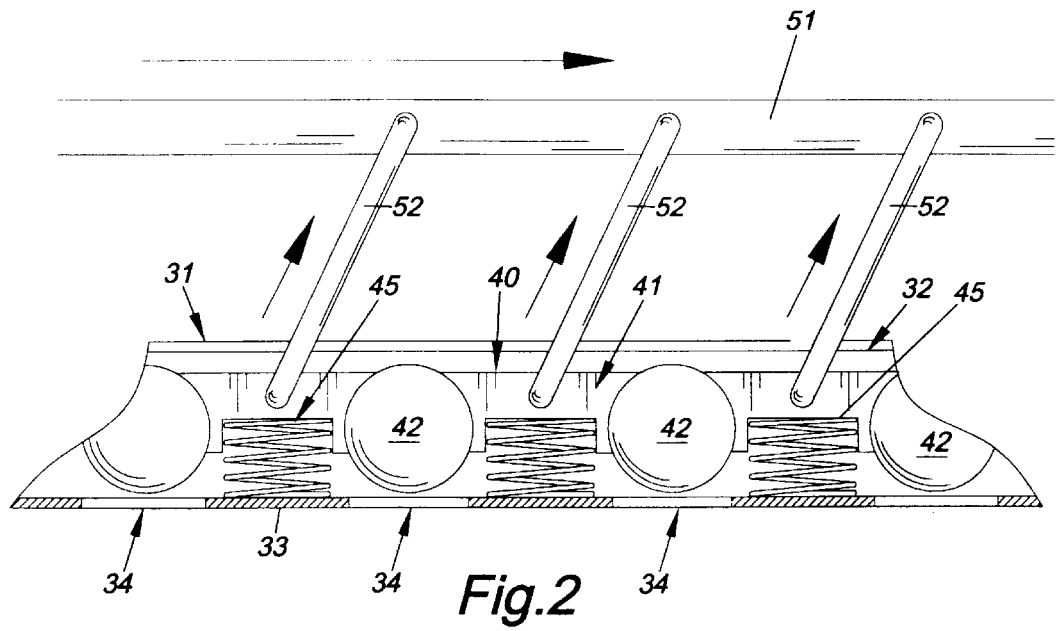
FIG. 2 is a cross-sectional view through one of the runner members showing the roller assembly in the retracted position; and, FIG. 3 is a cross-sectional view through one of the runner members showing the roller assembly in the fully extended position.
Figure 3:
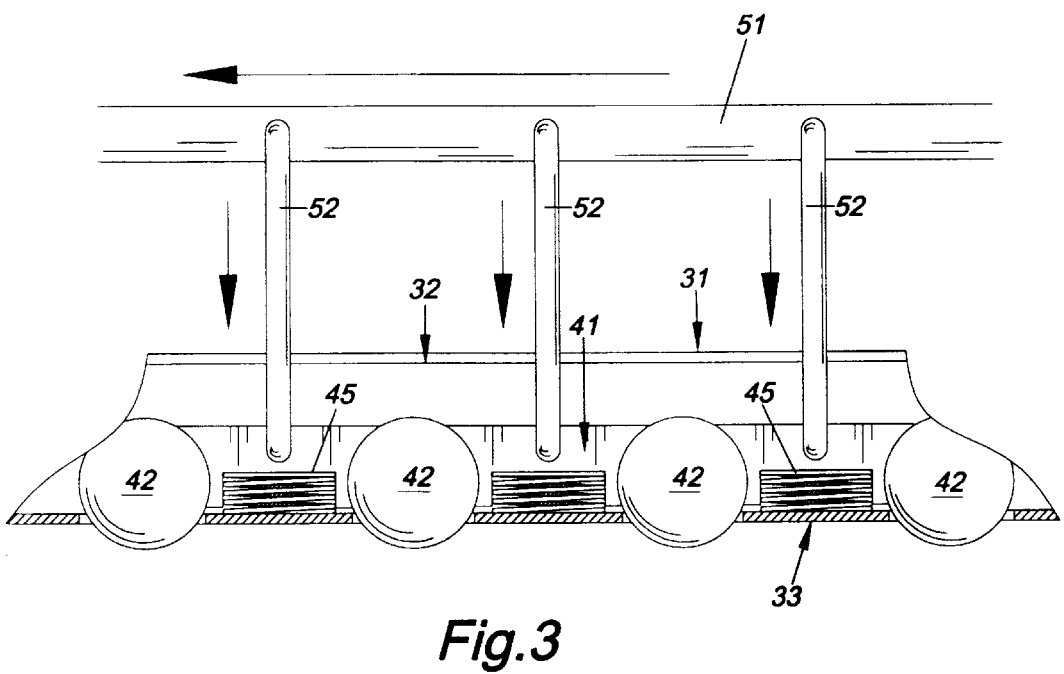

Turning now to FIGS. 1 through 3, it can be seen that the convertible sled unit 12 comprises a pair of hollow runner members 30 wherein the top surface 31 of each runner member 30 is provided with an elongated slot 32, the bottom surface 33 of each runner member 30 is provided with a plurality of spaced apertures 34 and each runner member 30 is also provided with an upwardly curved pointed front end 35.

Furthermore, as shown in FIG. 1, the top surface 31 of each runner member 30 is provided with a plurality of foot plates 36 which span the elongated slot 32 and are operatively connected to one of the downwardly depending foot elements 24, 25 on the opposite ends of the support legs 21, 22.

In addition, the top surface 31 of each runner member 30 is provided with a pair of actuator rod support posts 37 whose purpose and function will be described in greater detail further on in the specification.

As can best be seen by reference to FIGS. 2 and 3, the interior of each runner member 30 is provided with a spring loaded roller assembly designated generally as 40 and which includes an elongated bar member 41 having a plurality of roller elements 42 rotatably suspended within the bar member 41 wherein the lower portion of each roller element 42 projects beyond the bottom surface of the bar member 41 and is aligned with and dimensioned to project through one of the spaced apertures 34 formed in the bottom surface 33 of each runner member 30.

In addition, the roller assembly 40 further includes a plurality of spring elements 45 which are disposed between the bottom surface of the bar member 41 and the interior of the bottom surface 33 of each runner member 30 to normally bias the roller elements 42 in a retracted position relative to the spaced apertures 34 as shown in FIG. 2.

In addition, each of the actuator rods 51 are provided with a plurality of actuator lever arms 52 which are pivotally connected on their upper ends to one of the actuator rods 51, pivotally connected on their lower ends to one of the bar members 41 and dimensioned to be received in the elongated slots 32 in the upper surface 31 of the respective runner members 30.

As can best be seen by reference to FIG. 3, when the actuator handle 50 is positioned towards the front of the runner members 30 the actuator rods 51 will suspend the actuator lever arms 52 in a vertical orientation overcoming the biasing effect of the spring elements 45 to force the rotter elements 42 through the bottom surface 33 of the runner members 30 so that the roller elements 42 will allow the arrangement 10 to be rolled along a smooth surface such as a pavement or the like.

However, as shown In FIG. 2, when the handle member 50 is retracted away from the front of the runner members 30 the lever arms 52 will be disposed in an angularly offset fashion thereby allowing the spring elements 45 to force the bar member 41 upwardly thereby retracting the roller elements 42 into the interior of the runner members 30 so that the arrangement 10 can be slid along a sandy surface such as the beach.

Returning once more to FIG. 1, it can be seen that the towing unit 14 comprises a tow rope 60 provided with a handle element 61 wherein the opposite ends of the tow rope can be optionally attached to either the runner members 30 or a portion of the framework unit 11 to pull the arrangement 10 behind the user to and from a desired destination.

Returning once more to FIGS. 1 through 3, it can be seen that the actuator unit 13 comprises an actuator handle member 50 having a pair of elongated actuator rods 51 connected on the opposite ends of the handle member 50; wherein, the actuator rods 61 are slidably disposed in the actuator rod support posts 37 formed on each runner member 30.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A convertible sled arrangement for transporting coolers over both firm and sandy terrain wherein the arrangement comprises:

a support framework unit including a plurality of support legs wherein each support leg has a pair of downwardly depending foot elements and a plurality of support rods extending between said support legs and dimensioned to support the bottom of a cooler;

a convertible sled unit including a pair of runner members wherein each runner member is operatively associated with one of the pair of foot elements on each of the support legs;

a pair of roller assemblies wherein each assembly is operatively associated with one of the runner members; wherein the roller assembly includes a bar member having a plurality of roller elements rotatably suspended therein and projecting downwardly beyond the bottom of the bar member;

means for extending and retracting the roller assemblies relative to the runner members;

means for towing the arrangement behind the user; and means for biasing the roller elements into a retracted position relative to the runner members.

2. The arrangement as in claim 1; further including means for overcoming said means for biasing the roller elements into a retracted position relative to the runner members to extend the roller elements relative to the runner members.

3. The arrangement as in claim 1, wherein each roller assembly is at least partially disposed within the interior of one of the runner members.

4. The arrangement as in claim 3; wherein, each runner member is provided with a plurality of apertures that are each dimensioned to receive a portion of one of the roller elements.

5. The arrangement as in claim 4; wherein, said means for extending and retracting the roller assemblies relative to the runner members includes:

a plurality of actuator lever arms pivotally associated with each roller assembly wherein when the lever arms are disposed in a vertical orientation the roller assembly is disposed in the extended position and wherein the lever arms are disposed in an angularly offset position the roller assembly is disposed in the retracted position.

6. The arrangement as in claim 5; wherein, each of the runner members has a top surface provided with an elongated slot and the lever arms are dimensioned to be received through the elongated slots in the runner members.

7. The arrangement as in claim 6; wherein, the actuator lever arms are pivotally connected to a pair of actuator rods which are slidably disposed on a plurality of support posts provided on the runner members.

8. The arrangement as in claim 7; wherein, the pair of actuator rods are operatively connected to one another by an actuator handle.

9. A convertible sled arrangement for transporting coolers over both firm and sandy terrain wherein the arrangement comprises:

a support framework unit including a plurality of support legs wherein each support leg has a pair of downwardly depending foot elements and a plurality of support rods extending between said support legs and dimensioned to support the bottom of a cooler;

a convertible sled unit including a pair of runner members wherein each runner member is operatively associated with one of the pair of foot elements on each of the support legs;

a pair of roller assemblies wherein each assembly is operatively associated with one of the runner members; wherein the roller assembly includes a bar member having a plurality of roller elements rotatably suspended therein and projecting downwardly beyond the bottom of the bar member, and each roller assembly is at least partially disposed within the interior of one of the runner members;

means for extending and retracting the roller assemblies relative to the runner members; and means for towing the arrangement behind the user.

10. The arrangement as in claim 9; wherein, each runner member is provided with a plurality of apertures that are each dimensioned to receive a portion of one of the roller elements.

11. The arrangement as in claim 10; wherein, said means for extending and retracting the roller assemblies relative to the runner members includes:

a plurality of actuator lever arms pivotally associated with each roller assembly wherein when the lever arms are disposed in a vertical orientation the roller assembly is disposed in the extended position and wherein the lever arms are disposed in an angularly offset position the roller assembly is disposed in the retracted position.

12. The arrangement as in claim 11; wherein, each of the runner members has a top surface provided with an elongated slot and the lever arms are dimensioned to be received through the elongated slots in the runner members.

13. The arrangement as in claim 12; wherein, the actuator lever arms are pivotally connected to a pair of actuator rods which are slidably disposed on a plurality of support posts provided on the runner members.

14. The arrangement as in claim 13; wherein, the pair of actuator rods are operatively connected to one another by an actuator handle.

15. The arrangement as in claim 9 further including means for biasing the roller elements into a retracted position relative to the runner members.

16. The arrangement as in claim 15; further including means for overcoming said means for biasing the roller elements into a retracted position relative to the runner members to extend the roller elements relative to the runner members.

* * * * *